United States Patent
Mazzucchi et al.

(10) Patent No.: US 6,948,583 B2
(45) Date of Patent: Sep. 27, 2005

(54) STEERING EQUIPMENT FOR VEHICLES

(75) Inventors: Franco Mazzucchi, Modena (IT); Andrea Carreri, Modena (IT); Enrico Sedoni, Modena (IT); Eugenio Sereni, Modena (IT)

(73) Assignee: CNH America LLC, New Holland, PA (US)

( * ) Notice: Subject to any disclaimer, the term of this patent is extended or adjusted under 35 U.S.C. 154(b) by 71 days.

(21) Appl. No.: 10/382,151

(22) Filed: Mar. 5, 2003

(65) Prior Publication Data

US 2004/0173400 A1 Sep. 9, 2004

(30) Foreign Application Priority Data

Mar. 4, 2002 (IT) ..................................... BO2002A0107

(51) Int. Cl.[7] .............................................. B60K 26/00
(52) U.S. Cl. .................. 180/315; 200/61.54; 74/484 R; 74/552
(58) Field of Search ................................ 280/771, 775, 280/779; 180/78, 315, 332; 200/61.54–61.58 R; 74/552, 558, 471 XY, 484 R

(56) References Cited

U.S. PATENT DOCUMENTS

| 1,792,713 | A | * | 2/1931 | Schmelzkopf | 200/61.27 |
|---|---|---|---|---|---|
| 2,778,898 | A | * | 1/1957 | Lenning | 200/61.54 |
| 3,308,427 | A | * | 3/1967 | Hess | 340/468 |
| 3,881,076 | A | * | 4/1975 | Latka et al. | 200/61.54 |
| 4,078,628 | A | * | 3/1978 | Reichenberger | 180/333 |
| 4,180,713 | A | * | 12/1979 | Gonzales | 200/52 R |
| 4,537,089 | A | * | 8/1985 | Moneta | 74/493 |
| 4,655,308 | A | * | 4/1987 | Kraus et al. | 180/78 |
| 6,237,437 | B1 | | 5/2001 | Takahashi | |
| 6,462,289 | B1 | | 10/2002 | Kubota | |
| 6,490,861 | B2 | | 12/2002 | Biggi et al. | |
| 6,538,220 | B2 | * | 3/2003 | Durocher | 200/61.54 |
| 6,626,062 | B1 | * | 9/2003 | Yoshitake et al. | 74/552 |
| 2002/0047255 | A1 | | 4/2002 | Baume et al. | |

FOREIGN PATENT DOCUMENTS

| DE | 946870 | 8/1956 |
|---|---|---|
| DE | 19625966 A1 | 1/1998 |
| DE | 19935089 A1 | 2/2000 |
| DE | 20004953 U1 | 9/2000 |
| EP | 1342638 A3 | 1/2001 |
| EP | 1142773 A2 | 10/2001 |
| EP | 1.342.641 A3 | 9/2003 |
| IT | BO2002A000107 | 3/2002 |
| JP | 2001-76593 A | 3/2001 |

* cited by examiner

*Primary Examiner*—Paul N. Dickson
*Assistant Examiner*—L. Lum
(74) *Attorney, Agent, or Firm*—Collin A. Webb; John William Stader

(57) ABSTRACT

Steering equipment is provided with a transmission shaft (4) mounted so that it can turn within a steering column (2), and with a control device (8) for actuating an operating unit; the control device (8) being provided with a switch (9) and a control member (18), which has substantially the shape of the sector of a circle and can move between an operative position, a resting position in which the control member (18) sets itself about a longitudinal axis (3) of the steering column (2), and a position of actuation of the switch (9).

13 Claims, 5 Drawing Sheets

STEERING EQUIPMENT FOR VEHICLES

BACKGROUND OF THE INVENTION

The present invention relates to steering equipment for work vehicles, and more particularly, to a control device for steering equipment for agricultural vehicles.

In agricultural vehicles, it is known to use a steering unit including a steering column having a longitudinal axis, a steering transmission shaft mounted inside the steering column for rotating about the longitudinal axis and a steering wheel mounted on the transmission shaft. Additionally, a control device for actuating a steering operating unit may be provided. The control device may be operable to induce conversion between a "conventional steering mode" and a "fast steering mode" as described in EP-A-1.142.773, now U.S. Published patent application No. 2001/0032461 A1.

The steering unit is designed to control the steering of a pair of wheels of the work vehicle, usually by means of a hydraulic steering valve. The steering valve enables the steering wheel to continue to rotate about the longitudinal axis even when the vehicle wheels have reached their maximum steering angle. Consequently, a given steering angle of the vehicle wheels does not necessarily correspond to a given position of the steering wheel about the longitudinal axis.

Therefore, the known steering equipment as described above presents the drawback that the control device is normally mounted on the dashboard of the vehicle. To actuate the control device, the vehicle operator, who is normally already occupied in operating other functions such as a gear change, must let go of the steering wheel with one hand to perform a relatively distracting operation. Moreover, the control device may require uninterrupted actuation in order to remain active. The vehicle operator may be forced to stop operating other functions and return both hands to the steering wheel for controlling steering.

Thus, the purpose of the present invention is to provide steering equipment for a work vehicle which is free from the drawbacks referred to above.

SUMMARY OF THE INVENTION

According to a first aspect of the present invention, steering equipment is provided for a work vehicle including a steering unit having a steering column with a first longitudinal axis, a transmission shaft mounted inside the steering column for rotating about the first axis, a steering wheel mounted on the transmission shaft and a control device for actuating an operating unit. The control device further includes a switch and a control member, the control member having the shape of a sector of a circle and movable between an operative position, in which the control member is substantially co-axial with said first axis and an actuation position for the switch.

BRIEF DESCRIPTION OF THE DRAWINGS

The present invention will now be described further, by way of example, with reference to the accompanying drawings, in which.

DETAILED DESCRIPTION OF THE PREFERRED EMBODIMENTS

Figure 1:
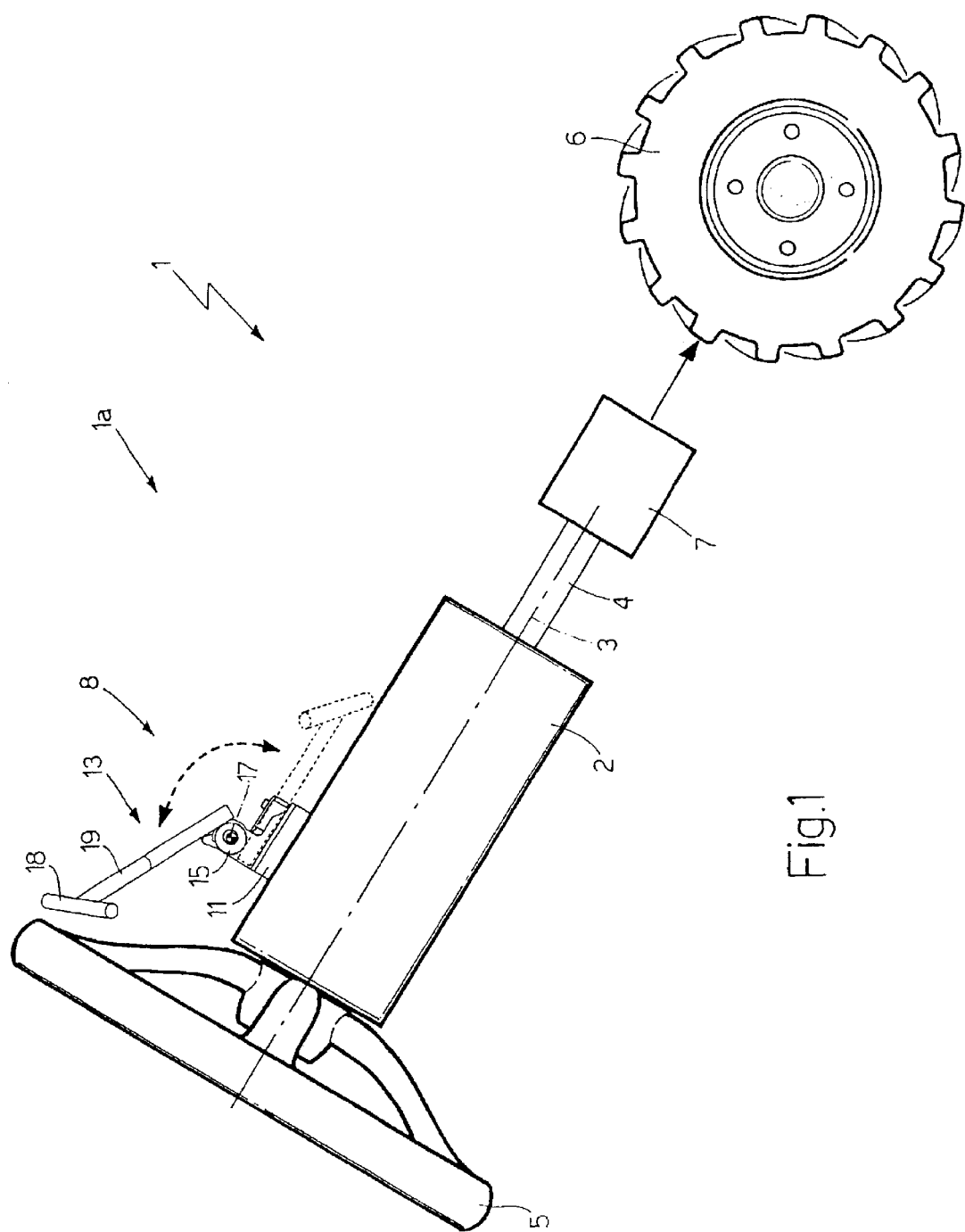
FIG. 1 is a schematic side view of a preferred embodiment of the steering equipment of the present invention.

With reference to FIG. 1, the reference number 1 designates, in general, steering equipment for work vehicles, and in particular for agricultural vehicles, such as tractors, combine harvesters and forage harvesters. The steering equipment includes a steering unit 1a having a tubular steering column 2 extending along a longitudinal axis 3 and connected in a known way to the vehicle chassis (not illustrated). A tubular transmission shaft 4 is mounted inside the steering column 2 co-axially with respect to the longitudinal axis 3. A steering wheel 5 is fitted on one end of the shaft 4 for controlling the steering of a pair of wheels 6 (only one of which is represented in FIG. 1) by means of a hydraulic unit 7 of the type described in the patent application No. EP-A-1.142.773, now U.S. Published patent application No. 2001/0032461 A1, the complete disclosure of which is hereby incorporated by reference.

The steering unit 1a includes a control device 8 for controlling the hydraulic unit 7 so as to vary a steering ratio. i.e., the ratio between the angle of rotation of the steering wheel 5 about the longitudinal axis 3 and the angle of steering of the wheels 6. The steering ratio may vary between a first relatively large value k1, which is characteristic of a first mode of operation, defined as "conventional steering", and a second relatively small value k2, which is characteristic of a second mode of operation, defined as "fast steering".

Figure 2:
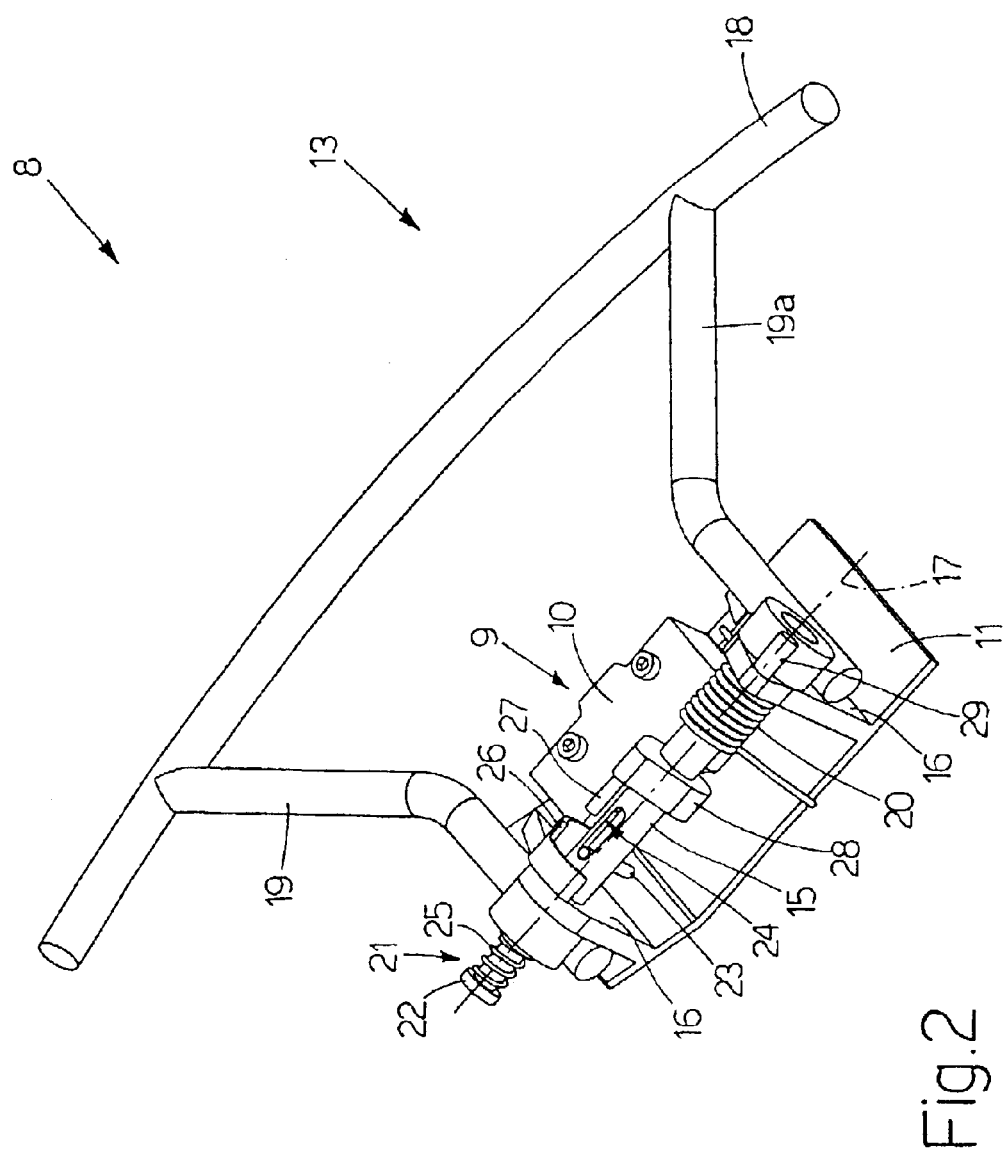
FIG. 2 is a perspective view of a detail of FIG. 1, illustrating a first operative position.
Figure 3:
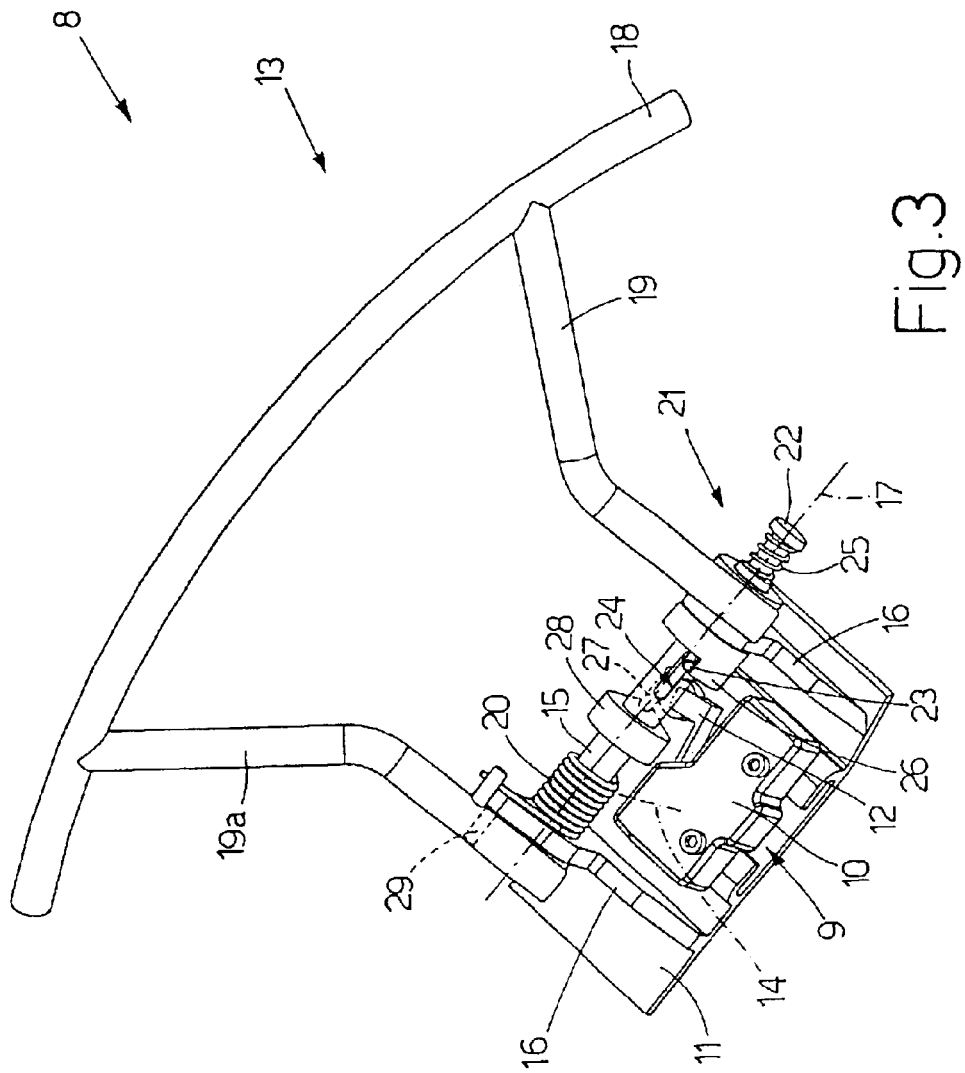
FIG. 3 is a perspective view of a detail of FIG. 1, illustrating a second operative position.

With reference to FIGS. 2 and 3, the control device 8 includes a switch 9 of a known type, which is connected to an electronic control unit (not illustrated). The electronic control unit selectively controls operation of the hydraulic unit 7 in response to a signal from the switch 9. The switch 9 includes a fixed part 10 mounted on a substantially plane plate 11 fixed to the steering column 2 and a mobile part defined by an arm 12 (FIG. 3). The mobile part 12 is hinged to the part 10 so as to oscillate relative thereto under the thrust of an actuator device 13, about a pivot axis 14 substantially perpendicular to the plate 11.

The actuator device 13 includes a tubular shaft 15 coupled pivotally to two ribs 16 projecting from the plate 11. The shaft 15 oscillates with respect to the ribs 16, about a longitudinal axis 17 that is substantially orthogonal to the axis 3 and 14. The actuator device 13 further includes a control member 18, which substantially has the shape of a sector of a circle. The actuator device 13 is fixed to the shaft 15 by means of two arms 19 and 19a that are fixed to the ends of the shaft 15.

The control member 18 is able to pivot about axis 17 under the force exerted by a vehicle operator and against the bias of a cylindrical helical spring 20. Spring 20 is fitted on the shaft 15 co-axially with respect to the axis 17 and is disposed between the plate 11 and arm 19a. The control member 18 pivots about the axis 17 in a counterclockwise direction, as viewed in FIGS. 1 and 2, from a resting position (indicated by a dashed line in FIG. 1). The control member 18 is offset a given distance from the steering wheel 5 to an operative position (indicated by a solid line in FIG. 1). The control member 18 is disposed in a position which is substantially parallel with respect to the axis 3. The control member 18 is placed in the resting position whenever inadvertent actuation of the control device 8 should be avoided.

The control member 18 is clamped in the resting and operative positions by means of a clamping device 21 including a release button 22. The release button 22 is engaged in such a way that it can turn and slide axially through the shaft 15, and is angularly clamped on the shaft 15 by means of a pin 23. The pin 23 extends outward from an outer surface of the button 22 to engage, in a slidable and angularly fixed manner, a radial slit 24 made through the shaft 15.

The clamping device 21 further includes a cylindrical helical spring 25, which is fitted on the button 22 co-axially with respect to the axis 17. The spring 25 is disposed between the shaft 15 and the button 22. The spring 25 is designed to keep the button 22 in a clamping position (FIGS. 2 and 3), in which the pin 23 is operable to engage an end-of-travel element 26. The pin engages the element 26 when the control member 18 is disposed in both its resting or its operative position. The element 26, which is fixedly attached to one of the ribs 16, has the shape of a sector of a circle which is coaxial to the axis 17, and extends from one of the ribs 16 in the direction of the other rib 16.

The arm 12 of the switch 9 is operated by means of a pin 27, which extends parallel to the axis 17 and projects from a central widened portion 28 of the shaft 15. When the member 18 is displaced into its operative position, the pin 27 is brought into touching contact with the arm 12 (FIG. 3), however initially without moving the arm 12.

The pin 27 is operable to rotate the arm 12 about the axis 14 into a position for closing the switch 9 upon a further displacement of the member 18 (in a counterclockwise direction, as viewed in FIG. 1, and in a clockwise direction, as viewed in FIG. 3), against the bias of the spring 20 and under the force exerted by the vehicle operator. Thus, the member 18 is moved from its operative position into an actuation position (not illustrated) until the arm 19a comes into contact with an end-of-travel element 29 projecting from the corresponding rib 16, parallel to the axis 17.

In use, the displacement of the member 18 from its resting position to its operative position is initiated by pushing the button 22 towards the nearby rib 16 along the axis 17 and into a releasing position, in which the pin 23 disengages from the element 26. Then, the member 18 is rotated about the axis 17 (in a counterclockwise direction, as viewed in FIGS. 1 and 2) against the bias of the spring 20. Finally, both the button 22 and the member 18 are released to enable the button 22 to set itself once again in its clamping position and, consequently, to enable the pin 23 to engage the other side of element 26.

Further movement of the member 18 from its operative position to its actuation position is performed by displacing the member 18 about the axis 17 (in a counterclockwise direction, as viewed in FIG. 1) against the bias of the spring 20 so as to bring the arm 19a into engagement with the end-of-travel element 29. By this action, pin 27 rotates the arm 12 into the position for closing the switch 9.

Figure 4:
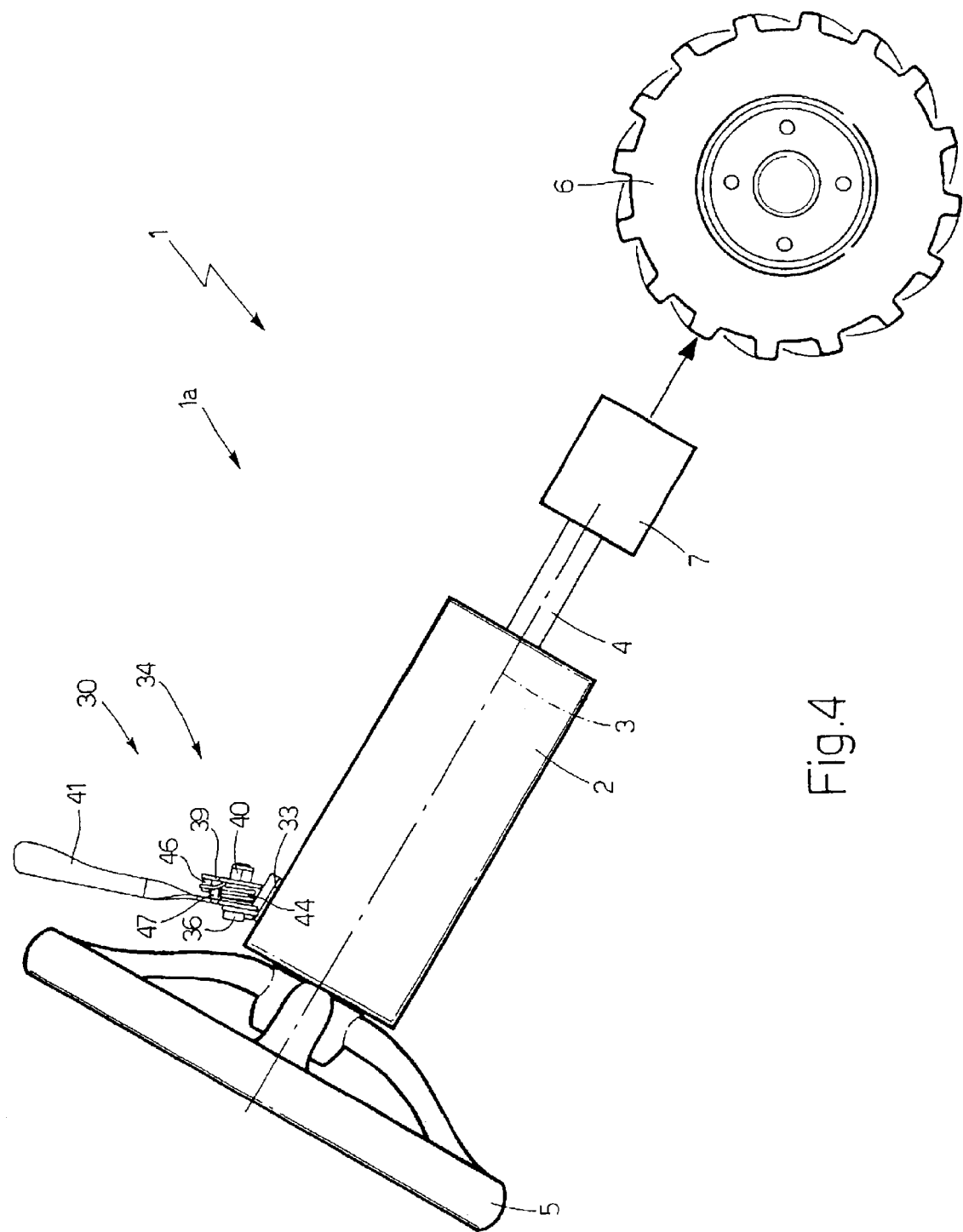
FIG. 4 is a schematic side view of another embodiment of the steering equipment of the present invention.
Figure 5:
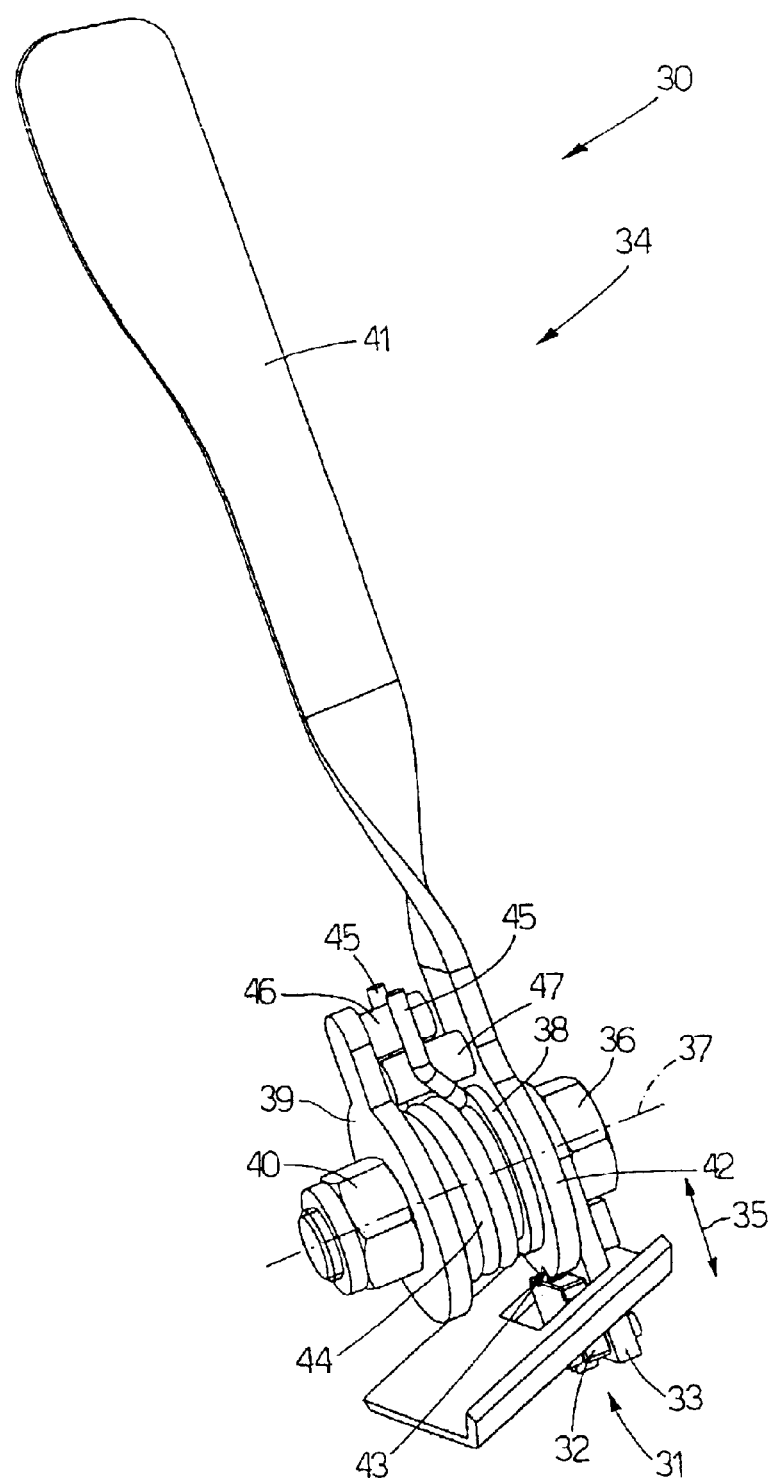
FIG. 5 is a perspective view of a detail of FIG. 4.

Another embodiment shown in FIGS. 4 and 5 differs from the embodiment in the previous FIGS. 1, 2 and 3, in that the steering unit 1a includes a different control device 30. The control device 30 includes a switch 31 of a known type. The switch 31 is connected to an electronic control unit (not illustrated) operable to selectively control operation of the hydraulic unit 7 in response to a signal from the switch 31.

The switch 31 includes a fixed portion 32 mounted on a plate 33 fixed to the steering column 2 and a mobile portion defined by a button (not illustrated) coupled in a known way to the portion 32 for performing rectilinear displacements, with respect to the portion 32 and under the thrust of an actuator device 34, in a given direction 35 away from and towards a position for closing of the switch 31.

The actuator device 34 includes a bolt 36, which extends through the plate 33 and has a longitudinal axis 37 transverse to the direction 35. The bolt 36 is engaged in such a way that it can turn and slide axially through a cylindrical spacer 38 and a washer 39, which are axially and angularly clamped on the bolt 36 by means of a locknut 40. Locknut 40 is screwed on one free end of the bolt 36 to tighten the spacer 38 and the washer 39 against the plate 33.

The button (not illustrated) of the switch 31 is actuated by means of a control lever 41, which has a central hub 42 coaxial to the axis 37. The lever 41 extends upwards from the hub 42, and is coupled in such a way that it can turn and is axially fixed to the spacer 38 so as to oscillate, with respect to the plate 33, about the axis 37.

The lever 41 is normally kept in an operative position (FIG. 5), in which the aforesaid button (not illustrated) is substantially set outside the portion 32 and inside a corresponding seat 43 made on the hub 42 by a cylindrical helical spring 44. The spring 44 is fitted on the spacer 38 coaxially with respect to the axis 37 and has two free ends set on opposite sides of two pins 46 and 47 parallel to the axis 37. The pin 46 projects from the washer 39 towards the lever 41, whereas the pin 47 projects from the lever 41 towards the washer 39.

In use, the lever 41 is able to move about the axis 37, against the bias of the spring 44 and under a thrust exerted by the operator indifferently either in the clockwise direction or in the counterclockwise direction, from its operative position to two actuation positions (not illustrated) of the switch 31. In each of the actuating positions, the button (not illustrated) is substantially moved downwardly within the portion 32 under the thrust of the hub 42, thereby actuating the switch 31. In this connection, it should be pointed out that, upon displacement of the lever 41 from its operative position to its actuation positions, one of the ends 45 of spring 44 engages the pin 46 and the other end 45 engages the pin 47.

The arrangement of the control devices 8 and 30 on the steering column 2 thus enables the hydraulic unit 7 to be operated with relative ease and convenience in such a way that the steering ratio will assume the value k1 when the member 18 and the lever 41 set themselves in their operative positions and the value k2 when the member 18 and the lever 41 set themselves in their positions of actuation of the switches 9 and 31, respectively.

What is claimed is:

1. Steering equipment for a work vehicle comprising
    a steering column having a first longitudinal axis;
    a transmission shaft mounted inside the steering column for rotating about the first axis;
    a steering wheel mounted on the transmission shaft;
    a switch; and
    a sector-shaped control member movable between three positions;
    an operative position,
    a resting position in which the control member is substantially parallel with the first axis, and,
    an actuation position that actuates the switch.
2. The steering equipment according to claim 1, further comprising actuator means operable to move the control member from the actuation position to the operative position.

3. The steering equipment according to claim 2, wherein the actuator means comprise at least one spring designed to maintain the control member normally in the operative position.

4. The steering equipment according to claim 1 further comprising a shaft fixed to the control member and mounted so that the shaft can turn about a second longitudinal axis, the shaft including an actuator member operable to actuate the switch upon a displacement of the control member from the operative position to the actuation position.

5. The steering equipment according to claim 2, wherein the actuator means are further operable to move the control member from the operative position to the resting position and the control member is positioned, when in the operative position, at a first distance from the steering wheel and, when in the resting position, at a second distance from the steering wheel that is greater than the first distance.

6. The steering equipment according to claim 1, further comprising a clamping device for clamping the control member in the operative position.

7. The steering equipment according to claim 1, further comprising an electronic control unit operable to control operation of an operating unit according to a signal from the switch.

8. The steering equipment according to claim 1, further comprising a shaft fixed to the control member and a clamping device for clamping the control member in the operative position, wherein the shaft is mounted so that the shaft can turn about a second longitudinal axis and includes an actuator member operable to actuate the switch upon a displacement of the control member from the operative position to the actuation position.

9. The steering equipment according to claim 8, wherein the clamping device comprises a pin disposed transverse to the second axis and coupled in an angularly fixed way to the shaft so as to rotate about the second axis and end-of-travel means operable to arrest the pin when the control member is set in the operative position.

10. The steering equipment according to claim 9, wherein the clamping device further comprises a release button that is coaxial with respect to the second axis and engaged in a slidable and angularly fixed way through the shaft, the pin being fixed to the release button and slidably engaging a slit defined by the shaft so as to be moved under the thrust of the release button away from and towards a releasing position, in which the pin disengages from the end-of-travel means.

11. The steering equipment according to claim 10, wherein the clamping device further comprises at least a second spring acting on the release button for moving and maintaining the pin in a clamped position.

12. The steering equipment according to claim 10, further comprising second end-of-travel means for arresting the control member in the actuation position.

13. The equipment according to claim 8, wherein the shaft is tubular.

\* \* \* \* \*